No. 628,541. J. F. KESTER. Patented July 11, 1899.
SELF FLUXING SOLDER.
(Application filed Nov. 4, 1898.)
(No Model.)
Fig. 1.
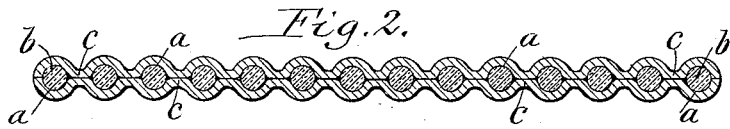
Fig. 2.
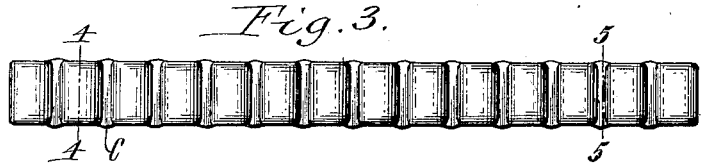
Fig. 3.
Fig. 4. Fig. 5.
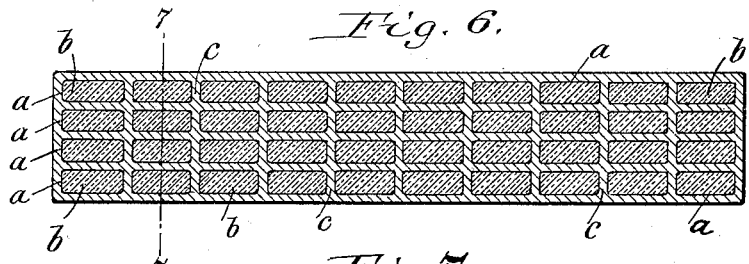
Fig. 6.
Fig. 7.
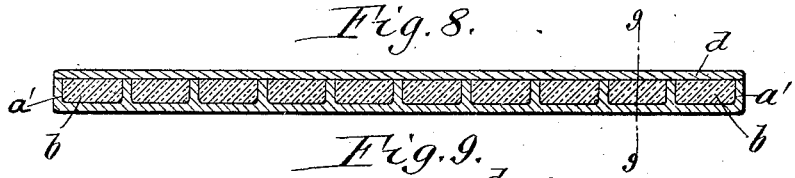
Fig. 8. Fig. 9.
Fig. 10.
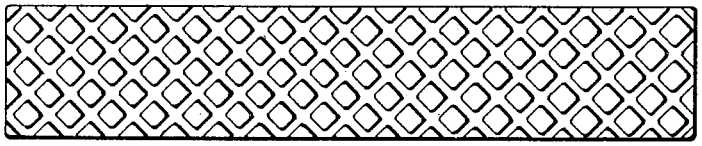
Witnesses:
Henry L. Deck.
Chas. F. Burkhart.
Jesse F. Kester, Inventor.
By Wilhelm & Bonner,
Attorneys.

UNITED STATES PATENT OFFICE.

JESSE F. KESTER, OF BUFFALO, NEW YORK.

SELF-FLUXING SOLDER.

SPECIFICATION forming part of Letters Patent No. 628,541, dated July 11, 1899.

Application filed November 4, 1898. Serial No. 695,444. (No model.)

*To all whom it may concern:*

Be it known that I, JESSE F. KESTER, a citizen of the United States, residing at the city of Buffalo, in the county of Erie and State of New York, have invented a new and useful Improvement in Self-Fluxing Solder, of which the following is a specification.

This invention relates to solder or soldering-wire which has a suitable flux incorporated therewith, so that the flux is melted with the solder and automatically supplied to the same. Such self-fluxing solder or wire has heretofore been constructed in the form of a tube having a continuous cavity from end to end, which cavity was filled with a flux either dry or pulverized or in the form of a paste. This construction is objectionable because as the flux fuses at a lower temperature than the solder it melts not only at the end of the solder, but some distance from the end of the same, and too much, therefore, runs out of the tubular solder at each operation, leaving little or no flux close enough to the end of the tube to be of any service for the next soldering operation.

The object of my invention is to so construct the solder that when the same is heated only the proper quantity of flux will be supplied thereto throughout the length of the rod or wire, and to that end my invention consists, essentially, in providing the solder with a longitudinal series of isolated cells or compartments containing the flux.

In the accompanying drawings, Figure 1 is a longitudinal section of a piece of tubular soldering-wire filled with a flux, showing its condition before being corrugated to form flux-cells. Fig. 2 is a longitudinal section of the finished solder on an enlarged scale. Fig. 3 is a top plan view thereof. Figs. 4 and 5 are cross-sections of the same in lines 4 4 and 5 5, Fig. 2. Fig. 6 is a top plan view of a slightly-modified construction of the solder. Fig. 7 is a cross-section in line 7 7, Fig. 6. Fig. 8 is a longitudinal section showing another modified construction. Fig. 9 is a cross-section in line 9 9, Fig. 8. Fig. 10 is a top plan view showing a modified form and arrangement of the flux-cells.

Like letters of reference refer to like parts in the several figures.

My improvement consists in forming the solder or soldering-wire with a series of adjoining isolated cells, cavities, or compartments $a$, which contain the flux $b$ instead of providing the solder with an unbroken core or filling of flux from end to end. By thus dividing the flux into separate sections or charges only one flux-cell is melted off the solder at a time, thereby always supplying the proper quantity of flux to the solder and preventing the irregular and excessive running out of the flux incident to the use of a solder having a continuous core of flux. These separate flux-cells may be formed and arranged in the solder in various ways.

In the preferred construction (shown in Figs. 2, 3, 4, and 5) the cells or pockets are formed by filling a tube or hollow wire of solder with a suitable flux either in dry, plastic, or liquid form, as shown in Fig. 1, and then compressing or pinching the tube at intervals, say, of about three-sixteenths of an inch, so as to close the interior walls of the tube together and form partitions or webs $c$, which isolate each cell from adjoining cells, as shown in Figs. 3, 4, and 5. The solder may be prepared in this manner by grooving ordinary and well-known wire solder lengthwise between rollers or otherwise to render it trough-shaped in cross-section, then filling the groove with flux, again closing the edges of the solder together and giving it a rounded or oval cross-section, and finally corrugating it between suitable rollers or otherwise for forming the partitions $c$. By this construction the flux is not only prevented from running out of the solder in irregular and excessive quantities, but the solder is easily divided into cells of uniform size containing a uniform quantity of flux.

When my improvement is applied to comparatively wide bars of solder—such as are used, for instance, by roofers—the bar may be provided with several rows of cells, as shown in Figs. 6 and 7, and the cells may be arranged in straight rows extending from end to end of the bar, as shown in said figure, or in diagonal rows, as shown in Fig. 10, in which latter case the cells may be lozenge-shaped, as shown.

As a further modification of my invention the self-fluxing solder may be formed from a solid bar or rod of solder by forming the flux cells or compartments a' in the surface of the bar and closing the same by a covering-strip d after filling them with flux. This covering-strip may be applied to the solder by pressure or otherwise.

I claim as my invention—

1. A self-fluxing solder provided with a longitudinal series of independent cells or compartments each containing a suitable flux, substantially as set forth.

2. A self-fluxing solder having a longitudinal series of adjoining cells or compartments closed on all sides and each containing a suitable flux, substantially as set forth.

3. A self-fluxing solder consisting of a tubular wire or rod of solder having its walls pressed together at intervals forming webs or partitions which divide the cavity of the tubular solder into a longitudinal series of isolated cells or compartments, said cells being filled with a suitable flux, substantially as set forth.

Witness my hand this 28th day of October, 1898.

JESSE F. KESTER.

Witnesses:
CARL F. GEYER,
ELLA R. DEAN.